United States Patent [19]
Park

[11] Patent Number: 6,023,307
[45] Date of Patent: *Feb. 8, 2000

[54] LIQUID CRYSTAL DISPLAY WITH PHOTO CONVERSION ELEMENTS ON A BLACK MATRIX BETWEEN COLOR FILTER PLATES

[75] Inventor: Eui-yeul Park, Seoul, Rep. of Korea

[73] Assignee: Samsung Display Devices Co., Ltd., Kyungki-do, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/971,356

[22] Filed: Nov. 17, 1997

[30] Foreign Application Priority Data

Nov. 20, 1996 [KR] Rep. of Korea ........................ 96-55840

[51] Int. Cl.[7] ...................................................... G02F 1/135
[52] U.S. Cl. ............................. 349/24; 349/106; 349/110; 349/2

[58] Field of Search ................................. 349/24, 106, 25, 349/27, 28, 12, 2, 110

[56] References Cited

U.S. PATENT DOCUMENTS

| | | | |
|---|---|---|---|
| 4,345,248 | 8/1982 | Togashi et al. | 349/28 |
| 4,744,637 | 5/1988 | Sekimura et al. | 349/106 |
| 5,589,961 | 12/1996 | Shigeta et al. | 349/41 |

*Primary Examiner*—James A. Dudek
*Attorney, Agent, or Firm*—Lowe Hauptman Gopstein Gilman & Berner

[57] ABSTRACT

A liquid crystal display including upper and lower transparent substrates arranged parallel and spaced apart from each other a predetermined distance, a liquid crystal layer formed between the upper and lower transparent substrates, a color filter layer having red(R), green(G) and blue(B) color filter plates at predetermined intervals, formed between the upper and lower transparent substrates, and a plurality of photoelectric conversion elements for converting external light to electrical signals to be generated, installed in a region between the color filter plates.

1 Claim, 2 Drawing Sheets

LIQUID CRYSTAL DISPLAY WITH PHOTO CONVERSION ELEMENTS ON A BLACK MATRIX BETWEEN COLOR FILTER PLATES

BACKGROUND OF THE INVENTION

1. Field of the Invention

The present invention relates to a liquid crystal display, and more particularly, to a liquid crystal display in which a photoelectric conversion element is provided on an unused space in a color filter layer to obtain image information of a subject facing an image display surface.

2. Description of the Related Art

Liquid crystal displays (LCD) are widely used in instruments and office automation apparatus and TV sets as well as portable electronic calculators and clocks.

Referring to FIG. 1 showing a conventional LCD, a liquid crystal layer 4 is formed between a first transparent substrate 1 and a second transparent substrate 2 which are arranged parallel to each other. A color filter layer 9 is formed on a facing surface of the first transparent substrate 1. Also, first and second electrode layers 5 and 6 for driving liquid crystals are formed on facing surfaces of the color filter layer 9 and the second transparent substrate 2, respectively. Liquid crystals of the liquid crystal layer 4 sealed by a sealant 3 become aligned in a predetermined direction by alignment layers 7 and 8. First and second polarizing plates 10 and 11 are provided on upper and lower portions of the first and second transparent substrates 1 and 2.

As shown in FIG. 2, the color filter layer 9 includes red(R), green(G) and blue(B) color filter plates 12 repeatedly arranged at predetermined intervals. The color filter layer 9 has a black matrix 13 for blocking light coming through intervals between the color filter plates 12. The black matrix 13 is an unused space on which no image is formed and covers most of the image display area. Meanwhile, bilateral image communication requires additional means for picking up a subject as well as a display for displaying an image, i.e., a CCD camera.

SUMMARY OF THE INVENTION

It is an object of the present invention to provide a liquid crystal display in which a light acceptance device for obtaining image information of a subject is provided at a black matrix between color filter plates to enable bilateral image communication.

To achieve the above object of the present invention, a liquid crystal display includes upper and lower transparent substrates arranged parallel and spaced apart from each other a predetermined distance; a liquid crystal layer is formed between the upper and lower transparent substrates a color filter layer having red(R), green(G) and blue(B) color filter plates at predetermined intervals, is formed between the upper and lower transparent substrates; a plurality of photoelectric conversion elements for converting external light to electrical signals to be generated, is installed in a region between the color filter plates.

Preferably, a black matrix is formed between the color filter plate of the color filter layer, and the photoelectric conversion elements are formed on the black matrix.

DESCRIPTION OF THE PREFERRED EMBODIMENTS

Figure 1:
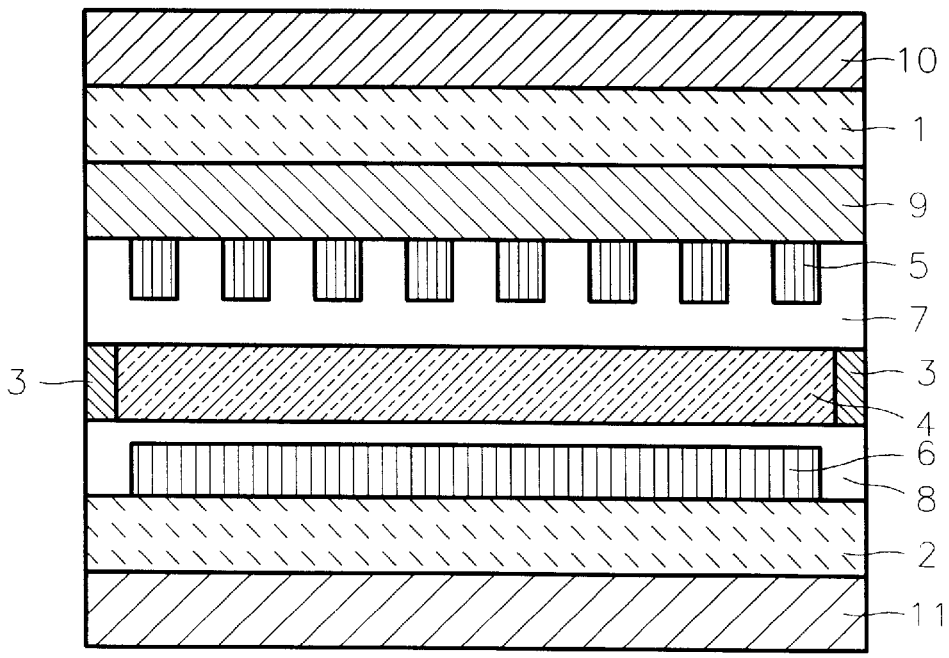
FIG. 1 is a sectional view of a conventional liquid crystal display.
Figure 2:
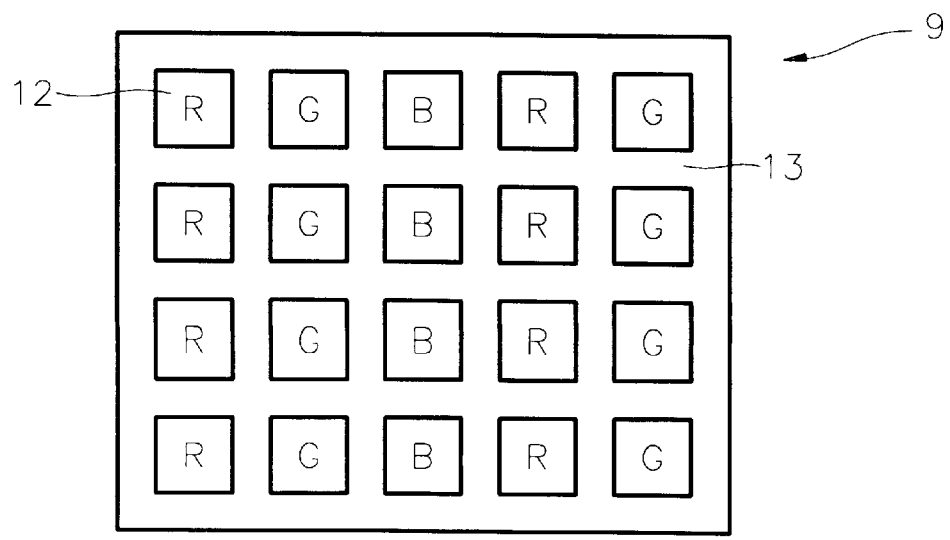
FIG. 2 is a plan view partially showing the color filter layer of the liquid crystal display of FIG. 1.
Figure 3:
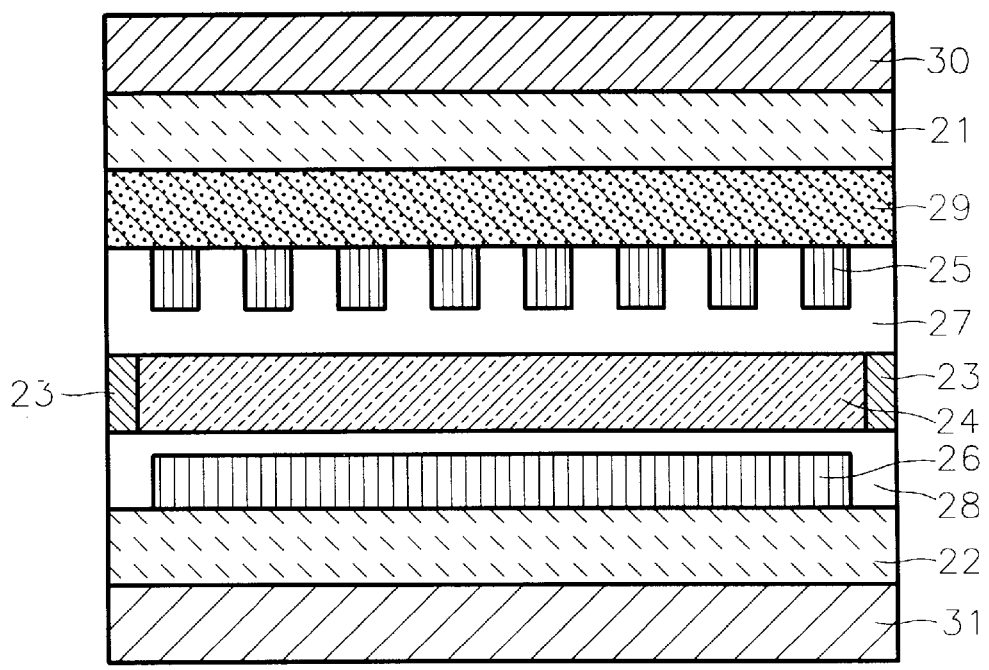
FIG. 3 is a sectional view of a liquid crystal display according to the present invention.

Referring to FIG. 3, the liquid crystal display (LCD) according to the present invention includes an upper transparent substrate 21 and a lower transparent substrate 22 which are arranged parallel and spaced apart from each other a predetermined distance, and a liquid crystal layer 24 sealed with a sealant 23 between the upper and lower transparent substrates 21 and 22. Liquid crystals of the liquid crystal layer 24 are aligned in a predetermined direction by alignment layers 27 and 28. First and second polarizing plates 30 and 31 are respectively attached to an upper surface of the upper substrate 21 and a lower surface of the lower substrate 22. First and second electrode layers 25 and 26 for driving the liquid crystals are formed on facing surfaces of the upper and lower substrates 21 and 22, respectively. A color filter layer 29 is provided between the first electrode layer 25 and the upper substrate 21.

Figure 4:
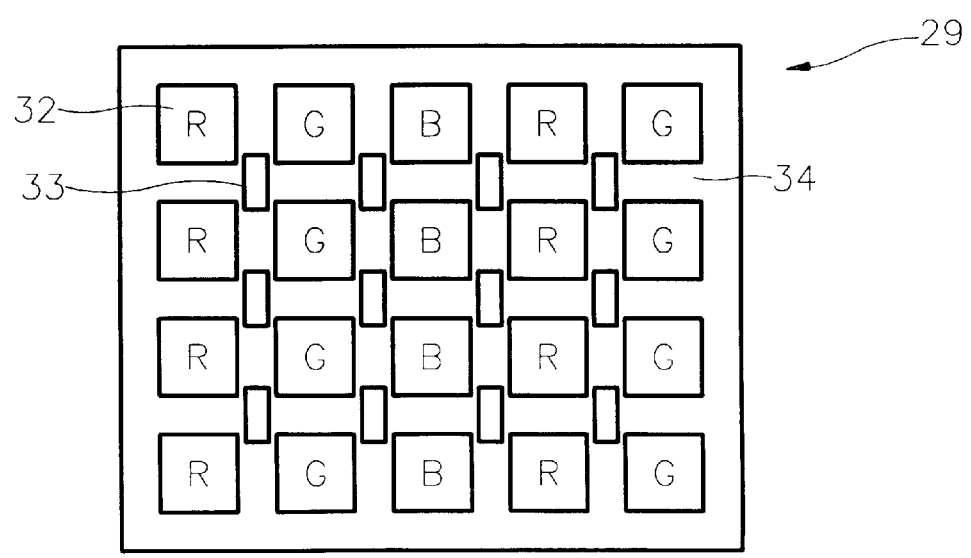
FIG. 4 is a plan view partially showing the color filter layer of the liquid crystal display of FIG. 3.

Referring to FIG. 4, the color filter layer 29 includes red(R), green(G) and blue(B) color filter plates 32 repeatedly arranged in a predetermined interval, and a black matrix 34 for blocking light is formed between the color filter plates 32. According to the present invention, a photoelectric conversion element 33, i.e., a charge-coupled device (CCD), is installed on the black matrix 34. A light acceptance window (not shown) of the photoelectric conversion element 33 is arranged to obtain image information of a subject facing an image display. The size of the color filter plate 32 is identical to that of a unit pixel area. The unit pixel area selectively applying an electric field to the liquid crystal, corresponds to a region in which the first and second electrode layers 25 and 26 intersect with each other.

In an embodiment of the present invention, the photoelectric conversion elements 33 are provided on the surface identical to the black matrix 34 of the color filter layer 29, and may be disposed at any arbitrary place under or above the region between the color filter plates 32, i.e., between the upper substrate 21 and the first polarizing plate 30. That is, the photoelectric conversion element 33 is disposed in a place where an image of an external subject can be picked up without disturbing the image formation of the liquid crystal display.

In an operation of the liquid crystal display, light from a back light (not shown) under second polarizing plate 31 sequentially passes through the second polarizing plate, the liquid crystal layer 24 and the first polarizing plate 30 according to selective driving of the first and second electrode layers 25 and 26, to form an image.

Meanwhile, the light received at the upper substrate 21 from an external subject is detected by the photoelectric conversion element 33 and the detected signal is converted to an electric signal and then the converted signal is transmitted to a signal processor (not shown) to be stored as image data or transmitted through a transmission line.

According to the liquid crystal display of the present invention, light is transmitted by the color filter plate 32 only in a region corresponding to a pixel, to thereby provide a clear image, and image information of the external subject may be obtained by photoelectric conversion elements 33, to thereby enable bilateral image communication. According to the liquid crystal display of the present invention, a CCD camera is not required for the bilateral image communication, and display of an image and detection of an image of the subject are simultaneously performed by an image display, to thereby increase the spatial use efficiency.

What is claimed is:

1. A liquid crystal display comprising:

upper and lower transparent substrates arranged parallel and spaced apart from each other a predetermined distance;

a liquid crystal layer formed between the upper and lower transparent substrates;

a color filter layer having red (R), green (G) and blue (B) color filter plates at predetermined intervals, formed between the upper and lower transparent substrates, the color filter plates being arranged to display a first image; and a plurality of photoelectric conversion elements for converting external light from a second image to electrical signals to be generated, and installed in a region between the color filter plates, wherein, in plan view, a black matrix is formed between the color filter plates of the color filter layer, and the photoelectric conversion elements are formed on the black matrix which surrounds each of the plurality of photoelectric conversion elements so as to physically separate and functionally decouple the photoelectric conversion elements from the color filter plates.

* * * * *